US012686738B2

(12) United States Patent
Yamashita et al.

(10) Patent No.: US 12,686,738 B2
(45) Date of Patent: Jul. 21, 2026

(54) POLYURETHANE RESIN, NON-NATURAL LEATHER, AND INK

(71) Applicant: MITSUI CHEMICALS, INC., Tokyo (JP)

(72) Inventors: Tatsuya Yamashita, Ichihara (JP); Toru Yagi, Ichihara (JP); Kazuyuki Fukuda, Ichihara (JP)

(73) Assignee: MTISUI CHEMICALS, INC., Tokyo (JP)

( * ) Notice: Subject to any disclaimer, the term of this patent is extended or adjusted under 35 U.S.C. 154(b) by 443 days.

(21) Appl. No.: 18/022,572

(22) PCT Filed: Aug. 26, 2021

(86) PCT No.: PCT/JP2021/031346
§ 371 (c)(1),
(2) Date: Feb. 22, 2023

(87) PCT Pub. No.: WO2022/045245
PCT Pub. Date: Mar. 3, 2022

(65) Prior Publication Data
US 2023/0323010 A1 Oct. 12, 2023

(30) Foreign Application Priority Data

Aug. 27, 2020 (JP) ................................. 2020-143814

(51) Int. Cl.
| | |
|---|---|
| *C08G 18/44* | (2006.01) |
| *C08G 18/32* | (2006.01) |
| *C08L 75/04* | (2006.01) |
| *C09D 11/102* | (2014.01) |
| *D06N 3/14* | (2006.01) |

(52) U.S. Cl.
CPC ......... *C08G 18/44* (2013.01); *C08G 18/3228* (2013.01); *C08L 75/04* (2013.01); *C09D*

*11/102* (2013.01); *D06N 3/148* (2013.01); *C08L 2201/54* (2013.01); *D06N 2211/28* (2013.01)

(58) Field of Classification Search
CPC ............................ C08G 18/44; C08G 18/3228
See application file for complete search history.

(56) References Cited

U.S. PATENT DOCUMENTS

| | | | | |
|---|---|---|---|---|
| 2015/0291724 A1* | 10/2015 | Kusano | .............. | C08G 64/0208 |
| | | | | 524/591 |
| 2021/0079216 A1 | 3/2021 | Shinohara et al. | | |
| 2023/0235111 A1* | 7/2023 | Urraca | .................. | C08G 18/73 |
| | | | | 528/1 |

FOREIGN PATENT DOCUMENTS

| | | | | | |
|---|---|---|---|---|---|
| CN | 101821310 A | | 9/2010 | | |
| EP | 3398980 A1 * | | 11/2018 | ............. | C08G 18/00 |
| EP | 3795600 A1 | | 3/2021 | | |
| JP | 2012-1654 A | | 1/2012 | | |
| JP | 2012001654 A | * | 1/2012 | | |
| JP | 2013227528 A | * | 11/2013 | | |
| JP | 2020117589 A | | 8/2020 | | |
| WO | 2019/221087 A1 | | 11/2019 | | |
| WO | 2019/230541 A1 | | 12/2019 | | |
| WO | 2020/105569 A1 | | 5/2020 | | |

OTHER PUBLICATIONS

JP-2012001654-A_2012-01-05_English Translation.*
JP-2013227528-A_English Translation.*

* cited by examiner

*Primary Examiner* — Michael L Leonard
(74) *Attorney, Agent, or Firm* — RANKIN, HILL & CLARK LLP

(57) ABSTRACT

A polyurethane resin includes a reaction product of a raw material component containing a polyisocyanate, a macropolyol, a hydrophilic group-containing polyol, and a chain extender. The polyisocyanate is an alicyclic polyisocyanate. The macropolyol contains a plant-derived macropolyol. A biomass degree of the reaction product is 30% or more.

5 Claims, No Drawings

POLYURETHANE RESIN, NON-NATURAL LEATHER, AND INK

TECHNICAL FIELD

The present invention relates to a polyurethane resin, a non-natural leather containing the polyurethane resin, and an ink containing the polyurethane resin.

BACKGROUND ART

Conventionally, an aqueous dispersion of a polyurethane resin has been widely used as a raw material of a non-natural leather.

Recently, the polyurethane resin has been required to correspond to carbon neutral from the viewpoint of environmental preservation. Therefore, it has been considered that a plant-derived polyol is used as the raw material of the polyurethane resin instead of a petroleum-derived polyol.

For example, a polyurethane resin aqueous dispersion obtained by the following method has been proposed. In other words, first, a polyether diol containing a plant-derived component, a polycarbonate diol containing a plant-derived component, 4,4'-methylenebis(cyclohexylisocyanate), 1,5-pentamethylenediisocyanate, 1,4-butanediol, and 2,2-dimethylolpropanoic acid are reacted, thereby obtaining a terminal NCO group-containing prepolymer. Next, ion-exchanged water and hydrous hydrazine are added to the terminal NCO group-containing prepolymer to be subjected to a chain-extension reaction. Thus, a polyurethane resin aqueous dispersion is obtained (ref: for example, Patent Document 1 (Example 3)).

CITATION LIST

Patent Document

Patent Document 1: International Patent Publication No. WO2019/221087

SUMMARY OF THE INVENTION

Problem to be Solved by the Invention

On the other hand, a non-natural leather obtained from the above-described polyurethane resin aqueous dispersion has a disadvantage that texture is not sufficient.

The present invention provides a polyurethane resin corresponding to carbon neutral and capable of obtaining a non-natural leather having excellent texture, and a non-natural leather containing the polyurethane resin. Further, the present invention includes an ink containing the above-described polyurethane resin.

Means for Solving the Problem

The present invention [1] includes a polyurethane resin including a reaction product of a raw material component containing a polyisocyanate, a macropolyol, a hydrophilic group-containing polyol, and a chain extender, wherein the polyisocyanate is an alicyclic polyisocyanate, the macropolyol contains a plant-derived macropolyol, and a biomass degree of the reaction product is 30% or more.

The present invention [2] includes the polyurethane resin described in the above-described [1], wherein the alicyclic polyisocyanate contains a bis(isocyanatomethyl) cyclohexane.

The present invention [3] includes the polyurethane resin described in the above-described [1] or [2], wherein the macropolyol contains a plant-derived polycarbonate polyol.

The present invention [4] includes the polyurethane resin described in any one of the above-described [1] to [3], wherein the chain extender contains a polyamine having three or more primary amino groups and/or secondary amino groups in one molecule.

The present invention [5] includes the polyurethane resin described in the above-described [4], wherein the polyamine contains a diethylenetriamine.

The present invention [6] includes a non-natural leather containing the polyurethane resin described in any one of the above-described [1] to [5].

The present invention [7] includes an ink containing the polyurethane resin described in any one of the above-described [1] to [5].

Effect of the Invention

The polyurethane resin of the present invention includes a reaction product of a raw material component containing a polyisocyanate, a macropolyol, a hydrophilic group-containing polyol, and a chain extender. The polyisocyanate is an alicyclic polyisocyanate, the macropolyol contains a plant-derived macropolyol, and a biomass degree of the reaction product is 30% or more.

Therefore, according to the polyurethane resin of the present invention, it is possible to obtain a non-natural leather which can correspond to carbon neutral and has excellent texture.

Further, since the non-natural leather of the present invention contains the above-described polyurethane resin, it corresponds to the carbon neutral and has the excellent texture.

Further, since the ink of the present invention contains the above-described polyurethane resin, it corresponds to the carbon neutral.

DESCRIPTION OF EMBODIMENTS

A polyurethane resin of the present invention includes a reaction product of a raw material component containing a polyisocyanate, a macropolyol, a hydrophilic group-containing polyol, and a chain extender.

The reaction product is a main component in a polyurethane resin. The main component is a component contained in the polyurethane resin at a predetermined amount or more. A ratio of the main component is, for example, 80% by mass or more, preferably 90% by mass or more with respect to the total amount of the polyurethane resin. Further, the ratio of the main component is, for example, 100% by mass or less with respect to the total amount of the polyurethane resin.

In the raw material component, the polyisocyanate, the macropolyol, the hydrophilic group-containing polyol, and the chain extender are essential components.

The polyisocyanate is an alicyclic polyisocyanate. In other words, the polyisocyanate consists of the alicyclic polyisocyanate.

Examples of the alicyclic polyisocyanate include alicyclic polyisocyanate monomers and alicyclic polyisocyanate derivatives.

Examples of the alicyclic polyisocyanate monomer include isophorone diisocyanate, cyclohexane diisocyanate, bis(isocyanatomethyl) cyclohexane, bis(isocyanatoethyl) cyclohexane, dicyclohexylmethane diisocyanate, methylcyclohexane diisocyanate, dimethyldicyclohexylmethane diisocyanate, dimer acid diisocyanate, 2,5-diisocyanatomethylbicyclo[2,2,1]-heptane, 2,6-diisocyanatomethylbicyclo[2, 2,1]-heptane, 2-isocyanatomethyl 2-(3-isocyanatopropyl)-5-isocyanatomethylbicyclo-[2,2,1]-heptane, 2-isocyanatomethyl-2-(3-isocyanatopropyl)-6-isocyanatomethylbicyclo-[2,2,1]-heptane, 2-isocyanatomethyl-3-(3-isocyanatopropyl)-5-(2-isocyanatoethyl)-bicyclo-[2,2,1]-heptane, 2-isocyanatomethyl-3-(3-isocyanatopropyl)-6-(2-isocyanatoethyl)-bicyclo-[2,2,1]-heptane, 2-isocyanatomethyl-2-(3-isocyanatopropyl)-5-(2-isocyanatoethyl)-bicyclo-[2,2,1]-heptane, and 2-isocyanatomethyl-2-(3-isocyanatopropyl)-6-(2-isocyanatoethyl)-bicyclo-[2,2,1]-heptane.

These alicyclic polyisocyanate monomers may be used alone or in combination of two or more.

An example of the alicyclic polyisocyanate derivative includes a modified product obtained by modifying the alicyclic polyisocyanate monomer by a known method.

More specifically, examples of the alicyclic polyisocyanate derivative include multimers, allophanate modified products, polyol modified products, biuret modified products, urea modified products, oxadiazinetrione modified products, and carbodiimide modified products.

These alicyclic polyisocyanate derivatives may be used alone or in combination of two or more.

These alicyclic polyisocyanates may be used alone or in combination of two or more.

As the alicyclic polyisocyanate, preferably, an alicyclic polyisocyanate monomer is used. More preferably, isophorone diisocyanate, bis(isocyanatomethyl) cyclohexane, and dicyclohexylmethane diisocyanate are used.

By using them, it is possible to obtain a non-natural leather having especially excellent texture.

Further, as the alicyclic polyisocyanate, more preferably, bis(isocyanatomethyl) cyclohexane is used.

When the bis(isocyanatomethyl) cyclohexane is used, it is possible to obtain the non-natural leather having especially excellent mechanical properties.

Examples of the bis(isocyanatomethyl) cyclohexane include 1,2-bis(isocyanatomethyl) cyclohexane, 1,3-bis(isocyanatomethyl) cyclohexane, and 1,4-bis(isocyanatomethyl) cyclohexane. These bis(isocyanatomethyl)cyclohexanes may be used alone or in combination of two or more.

As the bis(isocyanatomethyl) cyclohexane, preferably, 1,3-bis(isocyanatomethyl) cyclohexane and 1,4-bis(isocyanatomethyl) cyclohexane are used, more preferably, 1,3-bis (isocyanatomethyl) cyclohexane is used.

When the 1,3-bis(isocyanatomethyl) cyclohexane is used, it is possible to obtain the polyurethane resin having especially excellent storage stability.

The polyisocyanate is an alicyclic polyisocyanate. That is, the polyisocyanate does not contain a polyisocyanate other than the alicyclic polyisocyanate. Examples of the polyisocyanate other than the alicyclic polyisocyanate include chain aliphatic polyisocyanates, aromatic polyisocyanates, and araliphatic polyisocyanates.

When the polyisocyanate does not contain the polyisocyanate other than the alicyclic polyisocyanate, it is possible to obtain the non-natural leather having the excellent texture.

The macropolyol is an organic compound having two or more hydroxyl groups in a molecule and having a relatively high molecular weight. A number average molecular weight of the macropolyol (molecular weight in terms of polystyrene by GPC measurement) is, for example, above 400, and for example, 20000 or less.

The macropolyol contains a plant-derived macropolyol. Examples of the plant-derived macropolyol include plant-derived polyether polyols, plant-derived polyester polyols, plant-derived polycarbonate polyols, vegetable oil polyols, and plant-derived polyurethane polyols.

Examples of the plant-derived polyether polyol include plant-derived polyoxyalkylene (C2 to C3) polyols and plant-derived polytetramethylene ether glycols.

The plant-derived polyoxyalkylene polyol is obtained by addition-polymerizing an alkylene (C2 to C3) oxide to a plant-derived low molecular weight polyol.

The low molecular weight polyol is an organic compound having two or more hydroxyl groups in a molecule and having a relatively low molecular weight. A molecular weight of the low molecular weight polyol is, for example, 40 or more, and for example, 400 or less, preferably 300 or less.

Examples of the plant-derived low molecular weight polyol include 1,3-propanediol, 1,4-butanediol, 1,3-butanediol, isosorbide, glycerin, sorbitol, and sucrose. These may be used alone or in combination of two or more.

The alkylene (C2 to C3) oxide is an alkylene oxide having 2 to 3 carbon atoms. Examples of the alkylene (C2 to C3) oxide include ethylene oxide, propylene oxide, and trimethylene oxide. These may be used alone or in combination of two or more.

Examples of the addition polymerization include random addition polymerization and/or block addition polymerization.

In the addition polymerization, a known method and known conditions are used.

Also, examples of the plant-derived polyoxyalkylene (C2 to C3) polyol include plant-derived polytrimethylene ether polyols.

The plant-derived polytrimethylene ether polyol is obtained by condensation polymerizing the plant-derived 1,3-propanediol by a known method.

The plant-derived polytetramethylene ether glycol is obtained, for example, by ring-opening polymerizing the plant-derived tetrahydrofuran.

The plant-derived tetrahydrofuran is produced, for example, from the plant-derived furfural by a known method. The plant-derived furfural is produced from a plant material. Examples of the plant material include corns.

Also, the plant-derived polyether polyol can be obtained as a commercially available product. Examples of the commercially available product thereof include PTG-2000SN (P) (manufactured by Hodogaya Chemical Co., Ltd), PTG1000-SN (P) (manufactured by Hodogaya Chemical Co., Ltd), Cerenol H1000 (manufactured by DuPont), and Cerenol H2000 (manufactured by DuPont).

The plant-derived polyester polyol is obtained, for example, by subjecting the low molecular weight polyol and a plant-derived hydroxycarboxylic acid to a condensation reaction.

The low molecular weight polyol may be the above-described plant-derived low molecular weight polyol or may be a non-plant-derived low molecular weight polyol.

Examples of the non-plant-derived low molecular weight polyol include 1,2-ethylene glycol, 1,2-propylene glycol, 1,5-pentanediol, 1,6-hexanediol, neopentyl glycol, cyclohexane dimethanol, trimethylolpropane, and pentaerythritol.

These non-plant-derived low molecular weight polyols may be used alone or in combination of two or more.

Examples of the plant-derived hydroxycarboxylic acid include ricinoleic acid and hydroxystearic acid. The ricinoleic acid is, for example, included in a castor oil fatty acid.

The hydroxystearic acid is, for example, included in a hydrogenated castor oil fatty acid.

In the condensation reaction, a known method and known conditions are used.

Also, the plant-derived polyester polyol can be obtained as a commercially available product. An example of the commercially available product includes KURARAY POLYOL P-2050 (manufactured by KURARAY CO., LTD.).

The plant-derived polycarbonate polyol is obtained by subjecting the above-described plant-derived low molecular weight polyol and a diphenyl carbonate to a transesterification reaction.

In the transesterification reaction, a known method and known conditions are used.

Also, the plant-derived polycarbonate polyol can be obtained as a commercially available product. An example of the commercially available product includes BENEBiOL NL2070DB (manufactured by Mitsubishi Chemical Corporation).

The vegetable oil polyol is a plant-derived oil polyol. An example of the vegetable oil polyol includes hydroxyl group-containing vegetable oil. Examples of the hydroxyl group-containing vegetable oil include castor oil and coconut oil. Further, examples of the vegetable oil polyol include castor oil polyols and ester-modified castor oil polyols. These plant-derived macropolyols may be used alone or in combination of two or more.

The plant-derived polyurethane polyol is obtained by subjecting the plant-derived polyether polyol, the plant-derived polyester polyol, the plant-derived polycarbonate polyol, and/or the vegetable oil polyol, and a known polyisocyanate compound to a urethanization reaction.

In the urethanization reaction, a known method and known conditions are used. In addition, in the urethanization reaction, an equivalent ratio (OH/NCO) of hydroxyl groups (OH) to isocyanate groups (NCO) is adjusted to a ratio of above 1.

As the plant-derived macropolyol, preferably, a plant-derived polyether polyol, a plant-derived polyester polyol, and a plant-derived polycarbonate polyol are used, more preferably, a plant-derived polycarbonate polyol is used.

When the plant-derived macropolyol contains the plant-derived polycarbonate polyol, it is possible to obtain the non-natural leather having especially excellent light resistance and acid resistance.

A biomass degree of the plant-derived macropolyol is, for example, 30% or more, preferably 40% or more, more preferably 50% or more, further more preferably 60% or more. In addition, the biomass degree of the plant-derived macropolyol is, for example, 100% or less, preferably 99% or less.

The biomass degree can be determined in conformity with the standard of ASTM D6866 METHOD-B (hereinafter, the same applies).

The number average molecular weight of the plant-derived macropolyol (molecular weight in terms of polystyrene by GPC measurement) is, for example, 400 or more, preferably 500 or more, more preferably 800 or more, further more preferably 1000 or more. Further, the number average molecular weight of the plant-derived macropolyol is, for example, 20000 or less, preferably 10000 or less, more preferably 5000 or less, further more preferably 3000 or less.

An average number of hydroxyl groups of the plant-derived macropolyol is, for example, 1.5 or more, preferably 2 or more. Further, the average number of hydroxyl groups of the plant-derived macropolyol is, for example, 4 or less, preferably 3 or less.

Also, the macropolyol may include a non-plant-derived macropolyol.

The non-plant-derived macropolyol is a macropolyol excluding the plant-derived macropolyol. Examples of the non-plant-derived macropolyol include petroleum-derived macropolyols. More specifically, examples of the petroleum-derived macropolyol include petroleum-derived polyether polyols (excluding petroleum-derived polyoxyethylene polyol to be described later), petroleum-derived polyester polyols, petroleum-derived polycarbonate polyols, petroleum-derived polyurethane polyols, epoxy polyols, polyolefin polyols, acrylic polyols, and vinyl monomer-modified polyols. These petroleum-derived macropolyols may be used alone or in combination of two or more.

These non-plant-derived macropolyols may be used alone or in combination of two or more.

A content ratio of the non-plant-derived macropolyol is adjusted so that the biomass degree of the reaction product to be described later is 30% or more.

More specifically, the content ratio of the non-plant-derived macropolyol is, for example, 10% by mass or less, preferably 5% by mass or less, more preferably 1% by mass or less, particularly preferably 0% by mass with respect to the total amount of the macropolyol.

That is, particularly preferably, the macropolyol does not contain the non-plant-derived macropolyol. In other words, the macropolyol preferably consists of the plant-derived macropolyol.

When the macropolyol consists of the plant-derived macropolyol, the polyurethane resin and the non-natural leather can especially excellently correspond to carbon neutral.

The biomass degree of the macropolyol is, for example, 30% or more, preferably 40% or more, more preferably 50% or more, further more preferably 60% or more. In addition, the biomass degree of the macropolyol is, for example, 100% or less, preferably 99% or less.

The number average molecular weight of the macropolyol (molecular weight in terms of polystyrene by GPC measurement) is, for example, 400 or more, preferably 500 or more, more preferably 800 or more, further more preferably 1000 or more. Further, the number average molecular weight of the macropolyol is, for example, 20000 or less, preferably 10000 or less, more preferably 5000 or less, further more preferably 3000 or less.

The average number of hydroxyl groups of the macropolyol is, for example, 1.5 or more, preferably 2 or more. Further, the average number of hydroxyl groups of the plant-derived macropolyol is, for example, 4 or less, preferably 3 or less.

The hydrophilic group-containing polyol is an organic compound containing a hydrophilic group and two or more hydroxyl groups. Examples of the hydrophilic group include nonionic groups and ionic groups.

Examples of the hydrophilic group-containing polyol include nonionic group-containing polyols and ionic group-containing polyols.

The nonionic group-containing polyol is an organic compound containing a nonionic group and two or more hydroxyl groups. Examples of the nonionic group include polyoxyethylene groups.

Examples of the nonionic group-containing polyol include polyoxyethylene group-containing polyols and one-end-terminated polyoxyethylene glycols.

The polyoxyethylene group-containing polyol is an organic compound containing a polyoxyethylene group and two or more hydroxyl groups.

Examples of the polyoxyethylene group-containing polyol include a polyol containing a polyoxyethylene group in a main chain and a polyol containing a polyoxyethylene group in a side chain.

Examples of the polyol containing a polyoxyethylene group in a main chain include petroleum-derived polyoxyethylene polyols. Examples of the petroleum-derived polyoxyethylene polyol include petroleum-derived polyoxyethylene glycol and petroleum-derived polyoxyethylene triol.

An example of the polyol containing a polyoxyethylene group in a side chain includes an organic compound containing a polyoxyethylene group in the side chain and having two or more hydroxyl groups at the end of the main chain. The polyol containing the polyoxyethylene group in the side chain is synthesized by a known method.

As the polyol containing the polyoxyethylene group in the side chain, preferably, an organic compound containing a polyoxyethylene group in the side chain and having two hydroxyl groups at the end of the main chain (polyoxyethylene side chain-containing diol) is used. Specific examples of the polyoxyethylene side chain-containing diol are referred to Examples to be described later.

These nonionic group-containing polyols may be used alone or in combination of two or more.

The number average molecular weight of the nonionic group-containing polyol (molecular weight in terms of polystyrene by GPC measurement) is, for example, 200 or more, preferably 300 or more. Further, the number average molecular weight of the nonionic group-containing polyol is, for example, 6000 or less, preferably 3000 or less.

The ionic group-containing polyol is an organic compound containing an ionic group and two or more hydroxyl groups. Examples of the ionic group include anionic groups and cationic groups. Examples of the anionic group include carboxylic acid groups and sulfonic acid groups. Examples of the cationic group include quaternary ammonium groups. As the ionic group, preferably, an anionic group is used.

In other words, as the ionic group-containing polyol, preferably, an anionic group-containing polyol is used.

Examples of the anionic group-containing polyol include carboxylic acid group-containing polyols and sulfonic acid group-containing polyols.

Examples of the carboxylic acid group-containing polyol include polyhydroxyl carboxylic acids. Examples of the polyhydroxylcarboxylic acid include 2,2-dimethylolacetic acid, 2,2-dimethylollactic acid, 2,2-dimethylolpropionic acid (DMPA), 2,2-dimethylolbutanoic acid (DMBA), 2,2-dimethylolbutyric acid, and 2,2-dimethylolvaleric acid. These carboxylic acid group-containing polyols may be used alone or in combination of two or more.

Examples of the sulfonic acid group-containing polyol include dihydroxybutane sulfonic acid, dihydroxypropanesulfonic acid, N,N-bis(2-hydroxylethyl)-2-aminoethanesulfonic acid, and N,N-bis(2-hydroxylethyl)-2-aminobutanesulfonic acid. These sulfonic acid group-containing polyols may be used alone or in combination of two or more.

These anionic group-containing polyols may be used alone or in combination of two or more.

These ionic group-containing polyols may be used alone or in combination of two or more.

These hydrophilic group-containing polyols may be used alone or in combination of two or more.

As the hydrophilic group-containing polyol, preferably, an ionic group-containing polyol is used, more preferably, an anionic group-containing polyol is used, further more preferably, a carboxylic acid group-containing polyol is used.

The ratio of the hydrophilic group-containing polyol is, for example, 0.5 parts by mass or more, preferably 1 part by mass or more, more preferably 2 parts by mass or more with respect to 100 parts by mass of the macropolyol. Further, the ratio of the hydrophilic group-containing polyol is, for example, 20 parts by mass or less, preferably 10 parts by mass or less, more preferably 5 parts by mass or less with respect to 100 parts by mass of the macropolyol.

Examples of the chain extender include amino group-containing compounds. The amino group-containing compound is a low molecular weight compound having two or more primary amino groups and/or secondary amino groups in one molecule. In the amino group-containing compound, the amino group represents the primary amino group and/or the secondary amino group.

More specifically, examples of the amino group-containing compound include an amino group-containing compound having two amino groups in one molecule, and an amino group-containing compound having three or more amino groups in one molecule.

The amino group-containing compound having two amino groups in one molecule is a diamine. Examples of the diamine include aliphatic diamines, alicyclic diamines, aromatic diamines, araliphatic diamines, hydrazines, hydroxyl group-containing diamines, polyoxyethylene group-containing diamines, and alkoxysilyl group-containing diamines.

As the diamine, preferably, aliphatic diamines, alicyclic diamines, aromatic diamines, araliphatic diamines, and alkoxysilyl group-containing diamines are used.

Examples of the aliphatic diamine include ethylenediamine, propylenediamine, 1,3-propanediamine, 1,4-butanediamine, 1,5-pentanediamine (pentamethylenediamine), and 1,6-hexamethylenediamine.

Examples of the alicyclic diamine include isophoronediamine, 4,4'-dicyclohexylmethanediamine, 2,5-bis(aminomethyl)bicyclo[2.2.1]heptane, 2,6-bis(aminomethyl)bicyclo[2.2.1]heptane, 1,4-cyclohexanediamine, 1-amino-3-aminomethyl-3,5,5-trimethylcyclohexane, bis-(4-aminocyclohexyl)methane, diaminocyclohexane, 3,9-bis(3-aminopropyl)-2,4,8,10-tetraoxaspiro[5,5]undecane, 1,3-bis(aminomethyl)cyclohexane, and 1,4-bis(aminomethyl) cyclohexane.

Examples of the aromatic diamine include 4,4'-diphenylmethanediamine and tolylenediamine.

Examples of the araliphatic diamine include 1,3-xylylenediamine and 1,4-xylylenediamine.

Examples of the alkoxysilyl group-containing diamine include γ-aminopropyltrimethoxysilane, γ-aminopropyltriethoxysilane, N-phenyl-γ-aminopropyltrimethoxysilane, N-2-(aminoethyl)-3-aminopropyltrimethoxysilane, N-2-(aminoethyl)-3-aminopropyltriethoxysilane, N-2-(aminoethyl)-3-aminopropylmethyldimethoxysilane, and N-2-(aminoethyl)-3-aminopropylmethyldiethoxysilane.

These diamines may be used alone or in combination of two or more.

The amino group-containing compound having three or more amino groups in one molecule is a trifunctional or more polyamine. Examples of the trifunctional or more polyamine include trifunctional polyamines, tetrafunctional polyamines, and pentafunctional polyamines. An example of the trifunctional polyamine includes diethylenetriamine. An example of the tetrafunctional polyamine includes triethylenetetramine. An example of the pentafunctional polyamine includes tetraethylenepentamine. These trifunctional or more polyamines may be used alone or in combination of two or more.

These amino group-containing compounds may be used alone or in combination of two or more.

As the amino group-containing compound, preferably, a trifunctional or more polyamine is used, more preferably, a trifunctional polyamine is used, further more preferably, a diethylenetriamine is used. That is, the chain extender preferably contains the trifunctional or more polyamine, more preferably contains the trifunctional polyamine, further more preferably contains the diethylenetriamine.

When the chain extender contains these, it is possible to obtain a polyurethane resin having the especially excellent storage stability and having an excellent softening start temperature.

Further, as the amino group-containing compound, preferably, a diamine is used, more preferably, an aliphatic diamine and an alkoxysilyl group-containing diamine are used. That is, the chain extender preferably contains a diamine, more preferably contains an aliphatic diamine and/or an alkoxysilyl group-containing diamine.

When the amino group-containing compound contains these, it is possible to obtain a non-natural leather having especially excellent water resistance.

Further, as the amino group-containing compound, further more preferably, a diamine and a trifunctional polyamine are used in combination. That is, the chain extender preferably contains a diamine and a trifunctional polyamine in combination. The chain extender particularly preferably consists of a diamine and a trifunctional polyamine.

When the chain extender contains these, it is possible to obtain a polyurethane resin having the especially excellent storage stability, and a non-natural leather having the especially excellent water resistance.

The ratio of the chain extender is, for example, 0.5 parts by mass or more, preferably 1 part by mass or more with respect to 100 parts by mass of the macropolyol. Further, a mixing ratio of the chain extender is, for example, 20 parts by mass or less, preferably 15 parts by mass or less with respect to 100 parts by mass of the macropolyol.

In addition, when the chain extender contains the diamine, the ratio of the diamine is, for example, 10 parts by mass or more, preferably 30 parts by mass or more, more preferably 50 parts by mass or more, further more preferably above 50 parts by mass, particularly preferably 51 parts by mass or more with respect to 100 parts by mass of the total amount of the chain extender. Further, the ratio of the diamine is, for example, 100 parts by mass or less, preferably 90 parts by mass or less, more preferably 80 parts by mass or less, further more preferably 70 parts by mass or less, particularly preferably 60 parts by mass or less with respect to 100 parts by mass of the total amount of the chain extender.

In addition, when the chain extender contains the trifunctional or more polyamine, the ratio of the trifunctional polyamine is, for example, 10 parts by mass or more, preferably 20 parts by mass or more, more preferably 30 parts by mass or more, further more preferably 40 parts by mass or more with respect to 100 parts by mass of the total amount of the chain extender. Further, the ratio of the trifunctional polyamine is, for example, 100 parts by mass or less, preferably 90 parts by mass or less, more preferably 70 parts by mass or less, further more preferably 50 parts by mass or less, even more preferably below 50 parts by mass, particularly preferably 49 parts by mass or less with respect to 100 parts by mass of the total amount of the chain extender.

Further, the raw material component may contain a low molecular weight polyol as an optional component.

Examples of the low molecular weight polyol include the above-described plant-derived low molecular weight polyol and the above-described non-plant-derived low molecular weight polyol. These low molecular weight polyols may be used alone or in combination of two or more.

The content ratio of the low molecular weight polyol is adjusted so that the biomass degree of the reaction product to be described later is 30% or more.

More specifically, the content ratio of the low molecular weight polyol is, for example, 10 parts by mass or less, preferably 5 parts by mass or less, more preferably 1 part by mass or less, particularly preferably 0 parts by mass with respect to 100 parts by mass of the macropolyol.

That is, the raw material component particularly preferably does not contain the low molecular weight polyol. When the raw material component does not contain the low molecular weight polyol, it is possible to obtain a non-natural leather having the especially excellent texture.

Then, the polyurethane resin contains a reaction product obtained by reacting the above-described raw material component as an essential component.

The polyurethane resin is preferably produced as an aqueous dispersion in which a polyurethane resin is dispersed in water (hereinafter, referred to as a polyurethane aqueous dispersion). The polyurethane aqueous dispersion is also referred to as a polyurethane dispersion (PUD).

When the polyurethane resin is produced as the polyurethane aqueous dispersion, manufacturability and environmental properties are improved.

The polyurethane aqueous dispersion is produced, for example, by the following method.

That is, in this method, first, a polyisocyanate, a macropolyol, and a hydrophilic group-containing polyol are reacted, thereby obtaining an isocyanate group-terminated prepolymer.

The isocyanate group-terminated prepolymer is a polyurethane prepolymer having two or more isocyanate groups at the end of the molecule. In order to synthesize the isocyanate group-terminated prepolymer, each of the above-described components is blended at a predetermined ratio, and the resulting mixture is subjected to a urethanization reaction.

In the urethanization reaction, the equivalent ratio (isocyanate group/hydroxyl group) of the isocyanate groups in the polyisocyanate to the hydroxyl groups in the macropolyol and the hydrophilic group-containing polyol is for example, above 1, preferably 1.1 or more, and for example, 10 or less.

In the urethanization reaction, a known polymerization method is used. Examples of the polymerization method include bulk polymerization and solution polymerization. In the bulk polymerization, for example, the above-described components are blended under a nitrogen atmosphere, and reacted at a reaction temperature of 75 to 85° C. for about 1 to 20 hours. In the solution polymerization, for example, the above-described component is added to a known organic solvent under the nitrogen atmosphere, and the resulting mixture is reacted at the reaction temperature of 20 to 80° C. for about 1 to 20 hours.

Further, the polymerization reaction is continued until the content ratio of the isocyanate group in a reaction liquid is a predetermined value or less. The content ratio of the isocyanate group is, for example, 10% by mass or less, preferably 5% by mass or less, more preferably 3% by mass or less.

In addition, in the polymerization reaction, a known urethanization catalyst is added if necessary. Further, if necessary, an unreacted polyisocyanate is removed by a known method.

In addition, when the isocyanate group-terminated prepolymer contains the ionic group as a hydrophilic group, a neutralizing agent is preferably added. Thus, a salt of the ionic group is formed.

For example, when the isocyanate group-terminated prepolymer contains an anionic group, a conventional base is used as a neutralizing agent. Examples of the base include organic bases and inorganic bases.

Examples of the organic base include tertiary amines and secondary amines.

Examples of the tertiary amine include trialkylamine and alkanolamine. Examples of the trialkylamine include trialkylamines having 1 to 4 carbon atoms. Examples of the trialkylamine include trimethylamine and triethylamine. Examples of the alkanolamine include dimethylethanolamine, methyldiethanolamine, triethanolamine, and triisopropanolamine. Examples of the secondary amine include heterocyclic amines. An example of the heterocyclic amine includes morpholine.

These organic bases may be used alone or in combination of two or more.

Examples of the inorganic base include ammonia, alkali metal hydroxide, alkaline earth metal hydroxide, and alkali metal carbonate. Examples of the alkali metal hydroxide include lithium hydroxide, sodium hydroxide, and potassium hydroxide. Examples of the alkaline earth metal hydroxide include magnesium hydroxide and calcium hydroxide. Examples of the alkali metal carbonate include sodium carbonate and potassium carbonate.

These inorganic bases may be used alone or in combination of two or more.

These neutralizing agents may be used alone or in combination of two or more.

As the neutralizing agent, preferably, an organic base is used, more preferably, a tertiary amine is used, further more preferably, a trialkylamine is used, particularly preferably, a triethylamine is used.

An addition amount of the neutralizing agent is, for example, 0.4 equivalents or more, preferably 0.6 equivalents or more with respect to 1 equivalent of the anionic group. Further, the addition amount of the neutralizing agent is, for example, 1.2 equivalents or less, preferably 1.0 equivalent or less with respect to 1 equivalent of the anionic group.

The isocyanate group concentration (in terms of solid content) of the isocyanate group-terminated prepolymer is, for example, 0.3% by mass or more, preferably 0.5% by mass or more, more preferably 1.0% by mass or more. Further, the isocyanate group concentration (in terms of solid content) of the isocyanate group-terminated prepolymer is, for example, 15% by mass or less, preferably 12% by mass or less, more preferably 10% by mass or less.

Further, an average number of isocyanate groups of the isocyanate group-terminated prepolymer is, for example, 1.5 or more, preferably 1.9 or more. Further, the average number of the isocyanate groups of the isocyanate group-terminated prepolymer is, for example, 3.0 or less, preferably 2.5 or less.

Further, the number average molecular weight of the isocyanate group-terminated prepolymer (molecular weight in terms of polystyrene by GPC measurement) is, for example, 500 or more, preferably 800 or more. Further, the number average molecular weight of the isocyanate group-terminated prepolymer is, for example, 100000 or less, preferably 50000 or less.

Next, in this method, the isocyanate group-terminated prepolymer and the chain extender are reacted, for example, by the following method.

That is, in this method, first, the isocyanate group-terminated prepolymer is added to the water, thereby dispersing the isocyanate group-terminated prepolymer.

In order to disperse the isocyanate group-terminated prepolymer in the water, the isocyanate group-terminated prepolymer is gradually added to the water under stirring. The amount of the isocyanate group-terminated prepolymer is, for example, 10 to 500 parts by mass with respect to 100 parts by mass of water. In contrast to the description above, it is also possible to first add the water into the isocyanate group-terminated prepolymer, thereby water-dispersing the isocyanate group-terminated prepolymer.

Next, in this method, a chain extender is added to a dispersion liquid of the isocyanate group-terminated prepolymer, thereby chain-extending the isocyanate group-terminated prepolymer.

The mixing ratio of the chain extender is adjusted, for example, based on the equivalent ratio (amino group/isocyanate group) of the amino group of the chain extender to the isocyanate group of the isocyanate group-terminated prepolymer. More specifically, the equivalent ratio (amino group/isocyanate group) of the amino group of the chain extender to the isocyanate group of the isocyanate group-terminated prepolymer is, for example, 0.5 or more, preferably 0.7 or more. Further, the equivalent ratio (amino group/isocyanate group) of the amino group of the chain extender to the isocyanate group of the isocyanate group-terminated prepolymer is, for example, 1.1 or less, preferably 1.0 or less.

The chain extender may be added collectively or dividedly. Further, the chain extender may be blended as an aqueous solution or as an organic solvent solution. Preferably, the chain extender is added dividedly as an aqueous solution.

Then, after the addition of the chain extender, for example, the aqueous solution is stirred under normal temperature to complete the reaction.

In addition, when the solution polymerization is used, the organic solvent is desorbed, if necessary, by a known method. Also, when the organic solvent solution of the chain extender is used, the organic solvent is desorbed by a known method.

As a result, the polyurethane resin is obtained as the reaction product in which the isocyanate group-terminated prepolymer is chain-extended by the chain extender. The polyurethane resin is dispersed by the water.

The biomass degree of the reaction product is 30% or more, preferably 40% or more, more preferably 50% or more, further more preferably 60% or more. Further, the biomass degree of the reaction product is, for example, 100% or less, preferably 80% or less.

When the biomass degree is the above-described lower limit or more, it is possible to achieve the improvement in the environmental properties. When the biomass degree is the above-described upper limit or less, it is possible to achieve the improvement in productivity.

Further, the number average molecular weight of the reaction product (number average molecular weight by GPC measurement using standard polystyrene as a calibration curve) is, for example, 3000 or more, preferably 5000 or more. Further, the number average molecular weight of the polyurethane resin is, for example, 100000 or less, preferably 80000 or less.

Further, the softening start temperature of the reaction product is, for example, 150° C. or more, preferably 170° C. or more, more preferably 180° C. or more. Further, the softening start temperature of the reaction product is, for example, 300° C. or less, preferably 280° C. or less, more preferably 250° C. or less.

The softening start temperature is measured in conformity with Examples to be described later.

Further, the glass transition temperature of the reaction product is, for example, –50° C. or more, preferably –40° C. or more, more preferably –30° C. or more. Further, the glass transition temperature of the reaction product is, for example, 40° C. or less, preferably 20° C. or less, more preferably 0° C. or less.

The glass transition temperature is measured in conformity with Examples to be described later.

In addition, the polyurethane resin may contain a known additive in addition to the reaction product. In other words, the polyurethane resin may be a polyurethane resin composition.

Examples of the additive include cross-linking agents, silane coupling agents, plasticizers, defoaming agents, leveling agents, antifungal agents, rust inhibitors, matting agents, flame retardants, thixotropic agents, tackifiers, thickeners, lubricants, antistatic agents, surfactants, reaction retarders, antioxidants, ultraviolet absorbers, hydrolysis inhibitors, weather resistance stabilizers, heat resistance stabilizers, dyes, inorganic pigments, organic pigments, curing agents, anti-tack agents, water-swellable inorganic layered compounds, inorganic particles, and organic particles. These may be used alone or in combination of two or more. The addition ratio and the addition timing of the additive are appropriately set in accordance with its purpose and application.

The additive is a secondary component in the polyurethane resin. The ratio of the secondary component is, for example, 0% by mass or more with respect to the total amount of the polyurethane resin. Further, the ratio of the secondary component is, for example, 20% by mass or less, preferably 10% by mass or less with respect to the total amount of the polyurethane resin.

In addition, in the above-described method, the polyurethane resin is dispersed in the water. That is, the polyurethane aqueous dispersion is obtained. In the polyurethane aqueous dispersion, a portion of the polyurethane resin may be dissolved in the water.

If necessary, the water may be removed from the polyurethane aqueous dispersion to adjust the solid content concentration. Further, if necessary, the water may be added to the polyurethane aqueous dispersion to adjust the solid content concentration.

The solid content concentration of the polyurethane aqueous dispersion is, for example, 10% by mass or more, preferably 15% by mass or more, more preferably 20% by mass or more. Further, the solid content concentration of the polyurethane aqueous dispersion is, for example, 60% by mass or less, preferably 50% by mass or less, more preferably 45% by mass or less.

In addition, the polyurethane aqueous dispersion may contain the above-described additive in addition to the polyurethane resin and the water. The addition ratio and the addition timing of the additive are appropriately set in accordance with its purpose and application.

Then, the above-described polyurethane resin includes the reaction product of the raw material component containing the polyisocyanate, the macropolyol, the hydrophilic group-containing polyol, and the chain extender. Further, the polyisocyanate is the alicyclic polyisocyanate, the macropolyol contains the plant-derived macropolyol, and the biomass degree of the reaction product is 30% or more.

Therefore, according to the above-described polyurethane resin, it is possible to obtain the non-natural leather which can correspond to the carbon neutral and has the excellent texture.

Therefore, the above-described polyurethane resin is preferably used in the production of the non-natural leather.

The non-natural leather contains the above-described polyurethane resin. Examples of the non-natural leather include artificial leathers and synthetic leathers.

The artificial leather can be obtained, for example, by impregnating a polyurethane aqueous dispersion into a nonwoven fabric made of ultrafine fibers and thereafter, drying the nonwoven fabric.

The synthetic leather can be obtained, for example, by coating the polyurethane aqueous dispersion to a known substrate and drying it. Examples of the substrate include nonwoven fabrics, woven fabrics, and knitted fabrics. Examples of the substrate include known synthetic leathers. Examples of the known synthetic leather include polyvinyl chloride-based synthetic leathers.

Further, the synthetic leather can be also obtained by the following method. That is, first, the polyurethane aqueous dispersion is coated on a release paper to be dried, thereby obtaining a dry coating film. Next, a known resin composition is coated on the dry coating film to be dried, thereby forming a resin layer. Thereafter, a known substrate is laminated to the resin layer. Further, in the lamination, a thermocompression bonding roll or the like is used.

Since such a non-natural leather contains the above-described polyurethane resin, it corresponds to the carbon neutral and has the excellent texture.

Therefore, the non-natural leather is preferably used in various industrial fields. Examples of the application of the non-natural leather include automobile interior materials, railway interior materials, airplane interior materials, furniture, cushions, bags, purses, shoes, clothing materials, and cases.

In addition, the above-described polyurethane resin is also preferably used in the ink field.

More specifically, the above-described polyurethane resin is contained in the ink. Examples of the ink include inks for textile inkjet printing and inks for soft packaging.

Such an ink contains, for example, the above-described polyurethane resin as a binder.

Also, the ink may contain, if necessary, the above-described additive. More specifically examples of the additive include cross-linking agents, silane coupling agents, plasticizers, defoaming agents, leveling agents, antifungal agents, rust inhibitors, matting agents, flame retardants, thixotropic agents, tackifiers, thickeners, lubricants, antistatic agents, surfactants, reaction retarders, antioxidants, ultraviolet absorbers, hydrolysis inhibitors, weather resistance stabilizers, heat resistance stabilizers, dyes, inorganic pigments, organic pigments, curing agents, anti-tack agents, water-swellable inorganic layered compounds, inorganic particles, and organic particles. These may be used alone or in combination of two or more. The addition ratio and the addition timing of the additive are appropriately set in accordance with its purpose and application.

Since the above-described ink contains the above-described polyurethane resin, it corresponds to the carbon neutral.

EXAMPLES

Next, the present invention is described based on Examples and Comparative Example. The present invention is however not limited by the following Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Production Example 1 (Polyoxyethylene Side Chain-Containing Diol)

A four-neck flask equipped with a stirrer, a thermometer, a reflux tube, and a nitrogen-introducing tube was charged with 1000 g of methoxypolyethylene glycol having a number average molecular weight of 1000 (manufactured by TOHO Chemical Industry Co., Ltd.) and 1682 g of 1,6-hexamethylene diisocyanate (manufactured by Mitsui Chemicals, Inc.).

Next, the charged product was reacted under a nitrogen atmosphere at 90° C. for nine hours. Next, a reaction liquid was subjected to thin film distillation, thereby removing the unreacted 1,6-hexamethylene diisocyanate. Thus, a polyoxyethylene group-containing monoisocyanate was obtained.

Next, a four-neck flask equipped with a stirrer, a thermometer, a reflux tube, and a nitrogen-introducing tube was charged with 82.5 g of diethanolamine. Thereafter, 917.5 g of polyoxyethylene group-containing monoisocyanate was gradually added dropwise to diethanolamine, while being air-cooled, under a nitrogen atmosphere. The reaction temperature was retained at 70° C. or less. After completion of the dropwise addition, the obtained reaction product was stirred for about one hour under a nitrogen atmosphere at 70° C., and it was confirmed that the isocyanate group disappeared.

Thus, a polyoxyethylene side chain-containing diol (EO side chain diol) was obtained.

Examples 1 to 11 and Comparative Example 1

In the formulations described in Tables 1 to 2, a polyisocyanate, a macropolyol, a hydrophilic group-containing polyol, and a reaction solvent were mixed and reacted at 80° C. In Comparative Example 1, a low molecular weight polyol was mixed together with a macropolyol. Then, when an amine equivalent reached 1140, the reaction liquid was cooled down to 60° C. or less. Next, a dilution solvent described in Tables 1 to 2 was added to the reaction liquid and was further cooled down to 40° C. Next, the neutralizing agent described in Tables 1 to 2 was added to the reaction liquid and mixed for 10 minutes. Thus, an isocyanate group-terminated prepolymer was obtained.

Next, the isocyanate group-terminated prepolymer was transferred to another vessel. Next, ion-exchanged water was added dropwise to the isocyanate group-terminated prepolymer over 30 minutes, while the isocyanate group-terminated prepolymer was stirred at high speed at 25° C. The amount of the ion-exchanged water was adjusted to the same amount as that of the isocyanate group-terminated prepolymer. In addition, in Comparative Example 1, sodium dodecylbenzenesulfonate (DBS) was added as an emulsifier. Thus, an aqueous dispersion of the isocyanate group-terminated prepolymer was obtained.

Next, a chain extender was added to the aqueous dispersion of the isocyanate group-terminated prepolymer in the formulations described in Tables 1 to 2, and the obtained mixture was reacted at 25° C. for two hours. Thus, the reaction product was obtained.

Thereafter, the reaction solvent and the dilution solvent were desorbed, and the solid content concentration was adjusted to 30 to 35%. Thus, an aqueous dispersion (polyurethane aqueous dispersion, PUD) containing the polyurethane resin was obtained.

In addition, the biomass degree of the reaction product was obtained in conformity with the standard of ASTM D6866 METHOD-B.

Evaluation (1) Resin Coating Film

A polyurethane aqueous dispersion was placed in a tray made of polypropylene so as to obtain a coating film having a thickness of 200 m. Next, the polyurethane aqueous dispersion was dried at room temperature for one day, and then, dried at 110° C. for one hour. Thus, a resin coating film was obtained.

(2) Softening Start Temperature and Glass Transition Temperature

The dynamic viscoelastic spectrum of the resin coating film was measured under the following conditions, and the glass transition temperature and the softening start temperature were obtained.

Dynamic viscoelasticity measuring device: DVA-220, manufactured by IT Measurement Control Co., Ltd.

Measurement conditions: measurement start temperature: $-100°$ C., temperature rising rate: 5° C./min, measurement frequency: 10 Hz, tensile mode, gauge line length: 20 mm, static/dynamic stress ratio: 1.8 Then, the temperature at which the storage elastic modulus E' showed 1000000 Pa was set as the softening start temperature.

In addition, the temperature at which tan δ became the maximum was set as the glass transition temperature.

(3) Texture

The polyurethane aqueous dispersion was diluted to the solid content concentration of 25% with ethylene glycol. Next, a dilute solution was impregnated into a nonwoven fabric and dried at room temperature for one day to be then dried at 150° C. for 10 minutes. Thus, a non-natural leather was obtained. The resulting non-natural leather was evaluated based on the following criteria.

Excellent: soft texture and good feel.

Good: slightly hard texture.

Bad: hard texture and bad feel.

(4) Light Resistance

A resin coating film was set in a weather resistance testing machine (model number: Du Panel Optical Control FDP, manufactured by Suga Test instruments Co., Ltd.). Next, light of 28 W/m$^2$ was continuously irradiated to the resin coating film at 60° C. for 30 days.

Before and after the irradiation, a change in color of the resin coating film was confirmed and evaluated based on the following criteria.

Excellent: no change was observed.

Bad: yellowing and/or whitening were/was confirmed.

(5) Oleic Acid Resistance

The resin coating film was immersed in the oleic acid at room temperature for one day.

Before and after the immersion, a mass change rate of the resin coating film was confirmed and evaluated based on the following criteria.

$$\text{Mass Change Rate (\%)} = [(\text{Mass Before Immersion} - \text{Mass After Immersion})/\text{Mass Before Immersion}] \times 100$$

Excellent: mass change rate was below 10%.

Bad: mass change rate was 10% or more.

(6) Water Resistance

The resin coating film and the ion exchange water were placed in a pressure testing machine and heated at 150° C. for three hours.

Before and after the heating, the mass change rate of the resin coating film was confirmed and evaluated based on the following criteria.

$$\text{Mass Change Rate (\%)} = [(\text{Mass Before Immersion} - \text{Mass After Immersion})/\text{Mass Before Immersion}] \times 100$$

Excellent: mass change rate was below 10%.

Bad: mass change rate was 10% or more.

(7) Storage Stability

18

The polyurethane aqueous dispersion was stored at 60° C. for three months. Next, a resin coating film was obtained by the above-described method (1) using the polyurethane aqueous dispersion before and after the storage.

Thereafter, the resin coating film obtained using the polyurethane aqueous dispersion before the storage and the resin coating film obtained using the polyurethane aqueous dispersion after the storage were evaluated by the following method.

That is, the tensile strength of each resin coating film was measured in accordance with JIS K 7161 (1994). A tensile testing machine (model number: Model 205N, manufactured by INTESCO co., ltd.) was used. Further, the tensile rate was set at 300 mm/min.

Thereafter, a retention rate of a tensile strength (T2) of the resin coating film obtained using the polyurethane aqueous dispersion after the storage to a tensile strength (T1) of the resin coating film obtained using the polyurethane aqueous dispersion before the storage was confirmed and evaluated based on the following criteria.

$$\text{Retention Rate (\%)} = [T2/T1] \times 100$$

Excellent: retention rate of 80% or more

Bad: retention rate of below 80%

TABLE 1

| | | | Ex. 1 | Ex. 2 | Ex. 3 | Ex. 4 | Ex. 5 | Ex. 6 |
|---|---|---|---|---|---|---|---|---|
| Mixing Formulation | Polyisocyanate | Kind | 1,3-H$_6$XDI | 1,3-H$_6$XDI | 1,3-H$_6$XDI | 1,3-H$_6$XDI | 1,3-H$_6$XDI | 1,3-H$_6$XDI |
| | | Parts by Mass | 94.7 | 94.7 | 94.7 | 94.7 | 83.6 | 83.6 |
| | Macropolyol | Kind | NL2070DB | NL2070DB | NL2070DB | NL2070DB | NL2070DB | NL2070DB |
| | | Parts by Mass | 480.0 | 480.0 | 480.0 | 480.0 | 447.9 | 447.9 |
| | Low Molecular Weight Polyol | Kind | — | — | — | — | — | — |
| | | Parts by Mass | — | — | — | — | — | — |
| | Hydrophilic Group-Containing Polyol | Kind | DMPA | DMPA | DMPA | DMPA | EO Side Chain Diol | EO Side Chain Diol |
| | | Parts by Mass | 14.5 | 14.5 | 14.5 | 14.5 | 68.7 | 68.7 |
| | Reaction Solvent | Kind | MEK | MEK | MEK | MEK | MEK | MEK |
| | | Parts by Mass | 147.5 | 147.5 | 147.5 | 147.5 | 66.7 | 66.7 |
| | Dilution Solvent | Kind | AC | AC | AC | AC | AC | AC |
| | | Parts by Mass | 252.5 | 252.5 | 252.5 | 252.5 | 333.3 | 333.3 |
| | Neutralizing Agent | Kind | TEA | TEA | TEA | TEA | — | — |
| | | Parts by Mass | 10.7 | 10.7 | 10.7 | 10.7 | — | — |
| | Isocyanate Group-Terminated Prepolymer | Kind | Prepolymer A | Prepolymer A | Prepolymer A | Prepolymer A | Prepolymer B | Prepolymer B |
| | | Parts by Mass | 575.1 | 575.5 | 574.5 | 571.9 | 574.5 | 570.1 |
| | Emulsifier | Kind | — | — | — | — | — | — |
| | | Parts by Mass | — | — | — | — | — | — |
| | Chain Extender | Kind | EDA | EDA | DETA | EDA | EDA | EDA |
| | | Parts by Mass | 2.7 | 4.6 | 5.2 | 3.6 | 3.0 | 3.9 |
| | | Kind | DETA | — | — | KBM-602 | DETA | KBM-602 |
| | | Parts by Mass | 2.1 | — | — | 3.1 | 2.3 | 3.4 |
| | Ratio of Trifunctional Polyamine/Chain Extender | % | 40 | 0 | 100 | 0 | 40 | 0 |
| | Biomass Degree | % | 60 | 60 | 60 | 60 | 55 | 55 |
| Evaluation | Glass Transition Temperature | ° C. | −20 | −20 | −20 | −20 | −25 | −25 |
| | Softening Start Temperature | ° C. | 185 | 170 | 200 | 200 | 185 | 200 |
| | Texture | — | Excellent | Excellent | Excellent | Excellent | Excellent | Excellent |
| | Light Resistance | — | Excellent | Excellent | Excellent | Excellent | Excellent | Excellent |
| | Oleic Acid Resistance | — | Excellent | Excellent | Excellent | Excellent | Excellent | Excellent |

TABLE 1-continued

| | | Ex. 1 | Ex. 2 | Ex. 3 | Ex. 4 | Ex. 5 | Ex. 6 |
|---|---|---|---|---|---|---|---|
| Water Resistance | — | Excellent | Bad | Excellent | Excellent | Excellent | Excellent |
| Storage Stability | — | Excellent | Excellent | Excellent | Bad | Excellent | Bad |

TABLE 2

| | | | | Ex. 7 | Ex. 8 | Ex. 9 | Ex. 10 | Ex. 11 | Comparative Ex. 1 |
|---|---|---|---|---|---|---|---|---|---|
| Mixing Formulation | Polyisocyanate | | Kind | 1,3-H$_6$XDI | 1,3-H$_6$XDI | 1,4-H$_6$XDI | H$_{12}$MDI | IPDI | H$_{12}$MDI/PDI |
| | | | Parts by Mass | 94.7 | 94.7 | 94.7 | 121.2 | 105.9 | 36.9/9.3 |
| | Macropolyol | | Kind | PTG-2000SN(P) | P-2050 | NL2070DB | NL2070DB | NL2070DB | PTG-1000SN(P)/ NL1010DB |
| | | | Parts by Mass | 480.0 | 480.0 | 480.0 | 454.8 | 469.3 | 50/50 |
| | Low Molecular Weight Polyol | | Kind | — | — | — | — | — | 1,4-BD |
| | | | Parts by Mass | — | — | — | — | — | 0.5 |
| | Hydrophilic Group-Containing Polyol | | Kind | DMPA | DMPA | DMPA | DMPA | DMPA | DMPA |
| | | | Parts by Mass | 14.5 | 14.5 | 14.5 | 13.8 | 14.2 | 1.2 |
| | Reaction Solvent | | Kind | MEK | MEK | MEK | MEK | MEK | — |
| | | | Parts by Mass | 147.5 | 147.5 | 147.5 | 147.5 | 147.5 | — |
| | Dilution Solvent | | Kind | AC | AC | AC | AC | AC | — |
| | | | Parts by Mass | 252.5 | 252.5 | 252.5 | 252.5 | 252.5 | — |
| | Neutralizing Agent | | Kind | TEA | TEA | TEA | TEA | TEA | TEA |
| | | | Parts by Mass | 10.7 | 10.7 | 10.7 | 10.2 | 10.5 | 2 |
| | Isocyanate Group-Terminated Prepolymer | | Kind | Prepolymer C | Prepolymer D | Prepolymer E | Prepolymer F | Prepolymer G | Prepolymer H |
| | | | Parts by Mass | 575.1 | 575.1 | 575.1 | 575.1 | 575.1 | 574.5 |
| | Emulsifier | | Kind | — | — | — | — | — | DBS |
| | | | Parts by Mass | — | — | — | — | — | 3.5 |
| | Chain Extender | | Kind | EDA | EDA | EDA | EDA | EDA | HYD |
| | | | Parts by Mass | 2.7 | 2.7 | 2.7 | 2.6 | 2.7 | 3.6 |
| | | | Kind | DETA | DETA | DETA | DETA | DETA | — |
| | | | Parts by Mass | 2.1 | 2.1 | 2.1 | 2.0 | 2.0 | — |
| Ratio of Trifunctional Polyamine/ Chain Extender | | | % | 40 | 40 | 40 | 40 | 40 | 0 |
| Biomass Degree | | | % | 80 | 45 | 60 | 60 | 60 | 36 |
| Evaluation | Glass Transition Temperature | | ° C. | 2 | −30 | −20 | −10 | −15 | 20 |
| | Softening Start Temperature | | ° C. | 185 | 180 | 185 | 195 | 170 | 170 |
| | Texture | | — | Excellent | Excellent | Excellent | Good | Good | Bad |
| | Light Resistance | | — | Bad | Bad | Excellent | Excellent | Excellent | Bad |
| | Oleic Acid Resistance | | — | Bad | Bad | Excellent | Excellent | Excellent | Bad |
| | Water Resistance | | — | Excellent | Excellent | Excellent | Excellent | Bad | Bad |
| | Storage Stability | | — | Excellent | Excellent | Bad | Excellent | Excellent | Bad |

The details of abbreviations in Tables are described below.

1,3-H$_6$XDI: 1,3-bis(isocyanatomethyl) cyclohexane 1,4-H$_6$XDI: 1,4-bis(isocyanatomethyl) cyclohexane H$_{12}$MDI: dicyclohexylmethane diisocyanate IPDI: isophorone diisocyanate NL2070DB: trade name: BENEBiOL NL2070DB, polycarbonate diol, number average molecular weight of 2000, biomass degree of 75%, manufactured by Mitsubishi Chemical Corporation PTG-2000SN (P): polytetramethylene ether glycol, number average molecular weight of 2000, biomass degree of 95%, manufactured by Hodogaya Chemical Co., Ltd P-2050: trade name: KURARAY POLYOL P-2050, polyester diol, number average molecular weight of 2000, biomass degree of 60%, manufactured by KURARAY CO., LTD.

EO side chain diol: polyoxyethylene side chain-containing diol of Production Example 1

EDA: ethylenediamine

DETA: diethylenetriamine

HYD: hydrazine-monohydrate

KBM-602: alkoxysilyl group-containing diamine, N-2-(aminoethyl)-3-aminopropylmethyldimethoxysilane, manufactured by Shin-Etsu Chemical Co., Ltd.

MEK: methyl ethyl ketone

AC: acetone

TEA: triethylamine 1,4-BD: 1,4-butanediol

DBS: sodium dodecylbenzenesulfonate

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The polyurethane resin and the non-natural leather of the present invention are preferably used in the fields of automobile interior materials, railway interior materials, airplane interior materials, furniture, cushions, bags, purses, shoes, clothing, and cases. The ink of the present invention is preferably used in the fields of inks for textile inkjet printing and inks for soft packaging.

The invention claimed is:

1. A polyurethane resin comprising a reaction product of a raw material component containing a polyisocyanate, a macropolyol, a hydrophilic group-containing polyol, and a chain extender, wherein:

the polyisocyanate consists of an alicyclic polyisocyanate;

the macropolyol contains a plant-derived polycarbonate polyol;

the chain extender contains a diamine, and a polyamine having three or more primary amino groups and/or secondary amino groups in one molecule; and a biomass degree of the reaction product is 30% or more.

2. The polyurethane resin according to claim 1, wherein the alicyclic polyisocyanate contains a bis(isocyanatomethyl) cyclohexane.

3. The polyurethane resin according to claim 1, wherein the polyamine contains a diethylenetriamine.

4. A non-natural leather comprising:

the polyurethane resin according to claim 1.

5. An ink comprising:

the polyurethane resin according to claim 1.

* * * * *